Patented June 27, 1950

2,513,132

UNITED STATES PATENT OFFICE 2,513,132

PREPARATION OF AMINO ALCOHOLS

Seaver A. Ballard, Orinda, and Bradford P. Geyer, Berkeley, Calif., assignors to Shell Development Company, San Francisco, Calif., a corporation of Delaware No Drawing. Application February 10, 1947, Serial No. 727,724

4 Claims. (Cl. 260—584)

This invention relates to a method of preparing 3-amino propanols, in particular, 3-aminopropanol.

Broadly stated, the method comprises reacting with ammonia, or with a primary or secondary organic amine, and with hydrogen in the presence of a hydrogenation catalyst, a liquid mixture comprising products of the hydration of acrolein in an aqueous, preferably non-alkaline hydration medium, and if desired subjecting the resultant mixture to a suitable recovery treatment whereby the 3-amino propanol formed by the reaction may be recovered in a more highly purified form. The method is particularly suited to the preparation of the specific compound 3-aminopropanol. However, it also may be utilized with advantage to prepare substituted 3-amino propanols having up to two additional substituent groups attached to the nitrogen atom, viz. 3-sec-amino propanols and 3-tert-amino propanols.

The mixture of products of the hydration of acrolein that is utilized in the process of the invention may be prepared, for example, by reacting acrolein with an aqueous, non-alkaline hydration medium such as pure water, or, more preferably, water containing an amount of an acid or acid reacting material such as a strong mineral acid, e. g., sulfuric acid or hydrochloric acid, or an acidic salt such as sodium acid sulfate or sodium dihydrogen phosphate, sufficient to maintain the pH of the aqueous hydration mixture during the hydration reaction at a nonalkaline pH, preferably between about pH 0.5 and about pH 7. The acrolein may be reacted with water present in widely varying amounts relative to the acrolein; however, proportions of water of from about 5 to about 30 parts per part of acrolein, by weight, generally are most satisfactory. The reaction between the acrolein and the hydration medium may be accelerated, if desired, by heating a mixture of the acrolein and the hydration medium to an elevated temperature such as from about 30° C. upwards, avoiding, however, the use of excessively high temperature that would cause undesired side or decomposition reactions or excessive polymerization reaction to take place. Temperatures as high as 150° C. may be employed, if desired. The hydration mixture is maintained in the liquid state during the hydration reaction. If the temperature of hydration is above the normal boiling point of the reaction mixture, the hydration reaction thus may be effected in a closed reaction vessel under autogenous pressure, or pressure may be applied by introduction of an inert gas such as nitrogen, carbon dioxide, methane, or the like, into the reaction vessel in an amount sufficient to provide the requisite pressure. The hydration reaction is allowed to continue until an appreciable amount of products of hydration reaction have formed. Reaction times of from one hour or less up to 12 hours or more may be employed in the hydration process, the length of time being subject to variation inversely to the temperature employed but also being determined in part by the nature and amount of any acid or acid-reacting material that may be present, etc.

Although it will be distinctly understood that in its broader aspects the present invention is not limited to any specific conditions whereby the mixture of products of the hydration of acrolein is prepared, it has been found that the present process may be executed with particularly desirable results when the hydration of the acrolein is effected under the following conditions:

(a) A weight ratio of water to acrolein from about 15:1 to about 30:1.

(b) A pH of the hydration mixture from about 5.5 to about 7.

(c) A reaction temperature from about 90° C. to about 125° C.

(d) A pressure sufficient to maintain the reaction mixture in the liquid state.

(e) A reaction time of about one-half hour to about 3 hours.

The hydration mixture, prepared in the manner described in the foregoing paragraphs or in an equivalent manner, may be utilized in its entirety in accordance with the present process, or it may be separated into one or more fractions relatively rich in aliphatic products of the hydration of acrolein, and such fraction or fractions relatively rich in aliphatic products of the hydration of acrolein utilized in the process. The hydration of acrolein is known to form a complex mixture of products, which may include, for example, hydracrylaldehyde and products of the aldol or other condensation thereof, cyclic products such as heterocyclic compounds, and the like. The crude mixture also may contain any excess water and/or unreacted acrolein. A preferred mode of operation comprises separating the water and any unreacted acrolein and/or other lower boiling materials present from the hydration mixture as by distilling, or evaporating, them from the hydration mixture under reduced pressure, the remaining, non-volatilized residue, which comprises in a more concentrated substantially non-aqueous form the products of the hydration of the acrolein, being utilized in the process. If desired, this residue may be further separated into its components in any suitable manner to separate from the aliphatic products of the hydration of acrolein other products that may be present.

In accordance with the present invention the liquid mixture thus obtainable and comprising aliphatic products of the hydration of acrolein may be reacted in the liquid state with ammonia and with hydrogen in the presence of a hydrogenation catalyst to obtain the specific compound 3-aminopropanol, or it may be reacted with a primary or a secondary amine and with hydrogen in the presence of a hydrogenation catalyst to obtain, respectively, 3-sec-amino propanols or 3-tert-amino propanols. Although a wide variety of primary or secondary amines may be employed, the primary or the secondary amine preferably is one wherein the organic group or groups are relatively resistant to hydrogenation, i. e., they preferably contain only saturated or aromatic carbon-to-carbon linkages, as in the mono- or dialkylamines, mono- or diarylamines, alkylarylamines, cycloalkylamines, saturated heterocyclic amines which contain a heterocyclic nitrogen atom, etc. Representative amines within this preferred class of amines include, for example, ethylamine, diethylamine, N-methylethylamine, propylamine, N-ethylbutylamine, cyclohexylamine, dicyclohexylamine, N-methylcyclohexylamine, aniline, N-methylaniline, benzylamine, N-propylphenethylamine, piperidine, and their analogs and homologs.

The reaction between the mixture of products of the hydration of acrolein and the ammonia or amine and the hydrogen may be effected in either a stepwise manner or simultaneously, provided the presence together of the mixture of hydration products and hydrogen under hydrogenation conditions and in the absence of the ammonia or the amine, is substantially avoided. According to one embodiment of the present invention, the mixture of hydration products may be heated initially with the ammonia or the amine, and the resultant mixture, or a suitable fraction separated therefrom, subsequently treated with hydrogen in the presence of a hydrogenation catalyst and under conditions favoring hydrogenation reaction. Alternatively, the mixture of hydration products may be treated simultaneously with the ammonia or the amine and with hydrogen, in the presence of the hydrogenation catalyst.

The treatment of the mixture of hydration products with the ammonia or the amine desirably is carried out in the presence of a mutual inert solvent for the reactants, such as water, a lower aliphatic alcohol, a polyhydric alcohol, etc. Ethyl alcohol, isopropyl alcohol, glycol, propylene glycol, glycerine, tertiary butyl alcohol, etc., are among the solvent media that may be employed. The amount of solvent desirably is sufficient to provide a readily mobile reaction medium. The amount of solvent employed is not, in itself, critical. Amounts of solvent corresponding to from about 0.5 to about 5 parts by weight per part of the hydration products of the acrolein may be employed effectively. In certain cases the presence of a mutual solvent may be dispensed with entirely. The solvent may be added separately to the reaction mixture or, if desired, either the mixture of hydration products of acrolein or the nitrogenous reactant, or both, may be introduced into the reaction mixture in the form of a solution in the solvent.

The treatment of the mixture of products of the hydration of acrolein with the ammonia or the amine and the hydrogen may be effected under various conditions of temperature. Elevated temperatures favor the reaction, provided temperatures sufficiently high to cause undesired side reactions, decomposition reactions, etc., are avoided. In general, temperatures of from about 50° C. to about 250° C. are effective. The treatment of the mixture of hydration products with the ammonia or the amine results in an exothermic reaction. Depending upon the particular form and size of the apparatus, the provision of adequate cooling means to prevent excessive rise of temperature therefore may be desirable. The hydrogen may be introduced to the reaction mixture either simultaneously with the ammonia or the amine, or the mixture of hydration products first may be treated with the ammonia or the amine, and the resultant mixture subsequently treated with hydrogen in the presence of the hydrogenation catalyst. Conditions favoring hydrogenation reaction are employed during the treatment with hydrogen, as, for example, elevated temperatures, superatmospheric pressures of hydrogen, and the presence of catalytically active amounts of the hydrogenation catalyst. In general, temperatures of from about 50° C. to about 250° C. during the treatment with hydrogen are effective, pressures of hydrogen of from about 500 pounds per square inch to about 5000 pounds per square inch or more being suitable.

The hydrogenation catalyst may be any of the known hydrogenation catalysts which have the requisite activity under the conditions employed and in the presence of the particular reactants involved. The base metal hydrogenation catalysts comprising a base metal or a compound of a base metal of group VIII of the periodic system of the elements, i. e., Fe, Co, Ni, are particularly satisfactory. Other hydrogenation catalysts comprising, for example, vanadium, chromium, molybdenum, copper, manganese, palladium, or platinum, mixtures or alloys thereof, or catalytically active compounds thereof, also may be employed. Eminently satisfactory results have been obtained with the aid of the pyrophoric, finely divided nickel catalyst known to the art as Raney nickel hydrogenation catalyst and prepared according to the disclosures of the Raney patent—U. S. 1,628,190. If desired, the hydrogenation catalyst may be a non-alkaline base metal hydrogenation catalyst, i. e., a base metal hydrogenation catalyst that has been prepared and/or treated, as by washing with dilute aqueous acid, so that in its active state it is devoid of traces of alkali. Base metal hydrogenation catalysts which may be employed in the present process may be prepared by thermal and/or reductive decomposition of an organic salt such as a formate of the particular metal, by electrolytic processes or by other methods known to those skilled in the art. The catalyst may be used either in a finely divided form and suspended in or mixed with the reaction mixture, or it may be carried on a supporting material such as pumice, charcoal, silica gel, or the like which may be either inert or catalytically active. The catalyst may comprise promoter substances such as any of the salts or free metals known to enhance the activity of hydrogenation catalysts.

The amount of the catalyst that is employed most effectively depends upon its activity, the particular conditions of the reaction, and upon similar factors. Amounts corresponding to from about 2 per cent to about 20 per cent by weight of the reaction mixture are in general satisfactory, although the use of either larger or smaller proportions of catalyst is not precluded. The catalyst should be present during the treatment with the hydrogen, although its presence prior to such treatment is largely a question of manipulative convenience. It frequently is most convenient to add the hydrogenation catalyst initially to the mixture of hydration products of acrolein and carry out subsequently both the treatment with the ammonia or the amine and the treatment with the hydrogen in the presence of the catalyst.

A preferred embodiment of the present invention is represented by the preparation of 3-aminopropanol from acrolein via hydration of the acrolein and subsequent treatment of a mixture comprising products of the hydration with ammonia and with hydrogen in the presence of an active nickel hydrogenation catalyst. The acrolein thus may be reacted with water according to the method described previously herein, and the resultant mixture comprising products of the hydration of the acrolein subjected to partial distillation under reduced pressure whereby excess water, unreacted acrolein and any other low boiling materials present are removed. The undistilled residue, which is relatively rich in the aliphatic products of the hydration of acrolein, may be treated to concentrate further such aliphatic products, or, more conveniently, it may be employed as thus obtained. The mixture of hydration products desirably is mixed with from about 0.5 to about 5 times its weight of a lower aliphatic alcohol such as ethyl alcohol, isopropyl alcohol, or the like, and placed in a suitable pressure- and corrosion-resistant reaction vessel. An effective amount of a hydrogenation catalyst may be added at this time. Raney nickel hydrogenation catalyst may be employed. It may be used in either its normal, alkaline condition, or it may have been treated as with a dilute aqueous acidic solution, to remove the traces of alkali normally present and to impart a slightly acidic reaction to the catalyst. Amounts of the catalyst corresponding to from about 5 to about 15 per cent by weight of the mixture of hydration products may be employed advantageously. The reaction mixture containing the hydrogenation catalyst then is treated with gaseous ammonia preferably in stoichiometric excess. Hydrogen then is introduced into the reaction vessel under a pressure upwards from about 500 pounds, preferably between about 500 and about 2000 pounds per square inch, while maintaining the mixture at an effective hydrogenation temperature such as from about 50° C. to about 150° C. After the reaction with hydrogen is complete, the catalyst may be removed as by filtration and the 3-aminopropanol recovered from the reaction mixture in any suitable way, such as by fractional distillation or otherwise.

The process of the present invention may be practiced in either a batchwise, intermittent, or continuous manner. The process is not limited according to the type or form of apparatus that is used, subject, of course, to the obvious and necessary limitations that may be imposed by the conditions of pressure, etc., utilized in the process. In continuous operations, a bed of the hydrogenation catalyst may be positioned in a suitable reaction vessel. The mixture of hydration products may be contacted therewith in the presence of the ammonia or amine and hydrogen, and the products of reaction continuously or intermittently withdrawn for recovery of the desired products formed by the process. Numerous modifications thus are possible within the letter and the spirit of the present invention and will be apparent to those skilled in the art in view of the general disclosure of the invention herein.

The following example represents one specific embodiment of the invention which is defined in its broader aspects in the appended claims.

*Example*

A mixture of 84 parts by weight of acrolein and 1900 parts by weight of water, having a pH of 6 to 7, was heated in a corrosion-resistant reaction vessel for one hour at 110° C. under autogenous pressure. The resultant mixture was subjected to partial distillation under reduced pressure whereby the water and unreacted acrolein were removed. The remaining residue, which was a viscous liquid amounting to 45 parts in weight was dissolved in 80 parts of isopropyl alcohol. To the mixture there were added 5 parts of a finely-divided nickel hydrogenation catalyst which had been prepared by suspending Raney nickel catalyst in water and adding acid to the suspension until the suspension acquired a stable pH of 6.6, and separating the nickel from the suspension. The resultant mixture was placed in a pressure-resistant reaction vessel and 31.5 parts of ammonia ($NH_3$) were introduced into the vessel. Hydrogen gas then was applied to the contents of the reaction vessel at a pressure of 1500 pounds per square inch and a temperature of 100° C. for 4 to 5 hours. Additional treatment with hydrogen for 2 hours at 150° C. and 1500 pounds per square inch resulted in no further absorption of hydrogen. The resultant mixture was filtered to remove the catalyst, and the filtrate was fractionally distilled. The fraction boiling at 80° C. to 85° C. under a pressure of 10 millimeters of mercury was separated and redistilled. 3-aminopropanol was recovered as the fraction boiling at 81° C. under 9.5 millimeters mercury pressure and amounting to 30 parts in weight. The sample of 3-aminopropanol thus obtained was found to contain 18.65 per cent nitrogen (theoretical amount), 12.16 per cent hydrogen (theory, 12.09 per cent) and 48.31 per cent carbon (theory, 48.00 per cent), and to have a hydroxyl content of 1.31 equivalents per 100 grams (theory, 1.33) and a basicity of 1.33 equivalents per 100 grams (theory, 1.33). The overall conversion of acrolein to 3-aminopropanol was 26.5 per cent and the overall yield, based on acrolein consumed, was 51 per cent.

We claim as our invention:

1. A method of preparing 3-aminopropanol comprising treating with ammonia and with hydrogen in the presence of a Raney nickel hydrogenation catalyst at a temperature of from about 50° C. to about 250° C. and under a pressure of hydrogen of from about 500 to about 5000 pounds per square inch, a liquid mixture of products prepared by heating a mixture of acrolein with from about 15 to about 30 times its weight of water having a pH between about pH 5 and about pH 7, to a temperature between about 90° C. and about 125° C. for a time of from about ½ to about 3 hours.

2. The method of preparing 3-aminopropanol comprising treating with ammonia and with hydrogen in the presence of a nickel hydrogenation catalyst at a temperature of from about 50°

C. to about 250° C. and under a pressure of hydrogen of from about 500 to about 5000 pounds per square inch, a liquid mixture comprising products of the hydration of acrolein in from about 5 to about 30 times its weight of water having a pH between about pH 0.5 and about pH 7, at a temperature between about 30° C. and about 150° C.

3. A method of preparing 3-aminopropanol comprising hydrating acrolein by heating in the liquid state a mixture of acrolein with water having a pH between about pH 0.5 and about pH 7 and treating the products of the hydration, with ammonia and with hydrogen in the presence of a hydrogenation catalyst at a temperature of from about 50° C. to about 250° C. under a pressure of hydrogen between about 500 and about 5000 pounds per square inch.

4. A method of preparing 3-aminopropanol comprising hydrogenating by treatment with molecular hydrogen, in the presence of ammonia and of a hydrogenation catalyst, a liquid mixture comprising the products of hydration of acrolein in water having a pH of from about pH 0.5 to about pH 7, and recovering 3-aminopropanol from the hydrogenation mixture.

SEAVER A. BALLARD.
BRADFORD P. GEYER.

REFERENCES CITED

The following references are of record in the file of this patent:

UNITED STATES PATENTS

| Number | Name | Date |
|---|---|---|
| 2,069,302 | Dreyfus | Feb. 2, 1937 |
| 2,217,630 | Winans | Oct. 8, 1940 |
| 2,381,472 | Teter | Aug. 7, 1945 |

FOREIGN PATENTS

| Number | Country | Date |
|---|---|---|
| 485,377 | Great Britain | May 18, 1938 |